(12) United States Patent
Ripper et al.

(10) Patent No.: US 7,028,465 B2
(45) Date of Patent: Apr. 18, 2006

(54) METHOD AND DEVICE FOR CONTROLLING AN EXHAUST TREATMENT SYSTEM

(75) Inventors: Wolfgang Ripper, Stuttgart (DE); Bernd Mahr, Plochingen (DE); Stefan Wickert, Albershausen (DE)

(73) Assignee: Robert Bosch GmbH, Stuttgart (DE)

( * ) Notice: Subject to any disclaimer, the term of this patent is extended or adjusted under 35 U.S.C. 154(b) by 80 days.

(21) Appl. No.: 10/250,716

(22) PCT Filed: Dec. 22, 2001

(86) PCT No.: PCT/DE01/04923

§ 371 (c)(1),
(2), (4) Date: Nov. 20, 2003

(87) PCT Pub. No.: WO02/053888

PCT Pub. Date: Jul. 11, 2002

(65) Prior Publication Data

US 2004/0055284 A1    Mar. 25, 2004

(30) Foreign Application Priority Data

Jan. 8, 2001    (DE) ................... 101 00 420

(51) Int. Cl.
*F01N 3/00*    (2006.01)
(52) U.S. Cl. .................. 60/286; 60/274; 60/276; 60/295; 60/303
(58) Field of Classification Search ............... 60/274, 60/276, 286, 295, 301, 303
See application file for complete search history.

(56) References Cited

U.S. PATENT DOCUMENTS

| 5,369,956 A | * | 12/1994 | Daudel et al. | 60/276 |
| 5,628,186 A | * | 5/1997 | Schmelz | 60/274 |
| 6,082,102 A | * | 7/2000 | Wissler et al. | 60/286 |
| 6,092,367 A | * | 7/2000 | Dölling | 60/274 |
| 6,119,448 A | * | 9/2000 | Emmerling et al. | 60/274 |
| 6,305,160 B1 | * | 10/2001 | Hammerle et al. | 60/274 |
| 6,427,439 B1 | * | 8/2002 | Xu et al. | 60/286 |
| 6,508,057 B1 | * | 1/2003 | Bouchez et al. | 60/286 |
| 6,546,720 B1 | * | 4/2003 | van Nieuwstadt | 60/286 |
| 6,619,035 B1 | * | 9/2003 | Matsuoka et al. | 60/286 |
| 6,713,030 B1 | * | 3/2004 | Chandler et al. | 423/239.1 |
| 6,935,103 B1 | * | 8/2005 | Binder et al. | 60/286 |
| 6,941,746 B1 | * | 9/2005 | Tarabulski et al. | 60/286 |

FOREIGN PATENT DOCUMENTS

| DE | 195 36 571 | 4/1997 |
| DE | 198 07 935 | 8/1999 |
| DE | 199 03 439 | 8/2000 |
| DE | 100 11 612 | 10/2000 |
| WO | WO 00 67015 | 11/2000 |

* cited by examiner

Primary Examiner—Tu M. Nguyen
(74) Attorney, Agent, or Firm—Kenyon & Kenyon LLP

(57) ABSTRACT

A device and a method for controlling an exhaust-gas aftertreatment system, e.g., for an internal combustion engine, are described. The exhaust-gas aftertreatment system includes at least one catalytic converter. A preselectable quantity of reducing agent is supplied to the exhaust-gas aftertreatment system as a function of the state of the internal combustion engine and/or the exhaust-gas aftertreatment system. The quantity of reducing agent supplied is adjusted.

8 Claims, 3 Drawing Sheets

METHOD AND DEVICE FOR CONTROLLING AN EXHAUST TREATMENT SYSTEM

FIELD OF THE INVENTION

The present invention relates to a method and a device for controlling an exhaust-gas aftertreatment system.

BACKGROUND INFORMATION

A method and a device for controlling an exhaust-gas aftertreatment system are known from German Patent 199 03 439, where a method and a device for controlling an exhaust-gas aftertreatment system are described, the exhaust-gas aftertreatment system including at least one catalytic converter, and a predefinable quantity of reducing agent being supplied to the exhaust-gas aftertreatment system as a function of the state of the internal combustion engine and/or the exhaust-gas aftertreatment system. The quantity of reducing agent supplied is determined on the basis of operating characteristics of the internal combustion engine, such as the rotational speed and the quantity of fuel injected as well as variables which characterize the state of the exhaust-gas aftertreatment system, e.g., the exhaust gas temperature upstream from, within, and/or downstream from the exhaust-gas aftertreatment system.

When using urea as the reducing agent, metering of the reducing agent is problematical. If too little reducing agent is supplied to the exhaust-gas aftertreatment system, the result is that nitrogen oxides are not adequately converted and then they enter the environment. If too much reducing agent is supplied, in particular in the case of metering a urea solution, unwanted substances, e.g., ammonia, will enter the environment. In order to prevent the emission of ammonia, the usual procedure tends to be to meter too little reducing agent. In other words, the quantity of reducing agent is predefined so that tolerances in the area of the internal combustion engine, the exhaust-gas aftertreatment system or the metering system for metering the reducing agent do not result in the presence of ammonia in the exhaust gas.

SUMMARY OF THE INVENTION

By adjusting the quantity of reducing agent supplied, the present invention facilitates minimization of nitrogen oxide emissions, with the emission of ammonia being reliably prevented.

The adjustment may be based on a measured variable which characterizes the effect of the exhaust-gas aftertreatment system. Such a measured variable is supplied, for example, by a sensor which detects nitrogen oxide emissions and/or a sensor which detects ammonia emissions. In the case of systems which work with other reducing agents, other sensors will be used accordingly.

Sensors which detect measured values characterizing the effect of the exhaust-gas aftertreatment system may be used. These measured variables may depend on the concentration of various substances. These are substances that are not converted at all, substances converted only partially in the exhaust-gas aftertreatment system, substances required for the reaction, and/or intermediates. One may use sensors which detect substances which occur in the exhaust gas system downstream from the exhaust-gas aftertreatment system and are necessary for the reaction in the exhaust-gas aftertreatment system or are formed as intermediates during the reaction. One may use a nitrogen oxide sensor whose different variants may be used for exhaust-gas aftertreatment. Furthermore, it may be used for other functions in the area of control of the internal combustion engine and/or the exhaust-gas aftertreatment system. In the case of systems using urea as the reducing agent, an ammonia sensor may be used.

Adjustment may be performed only in certain operating states of the internal combustion engine and/or the exhaust-gas aftertreatment system. In these particular operating states, the measured variable(s) is/are compared with values to be expected, and the quantity of reducing agent is corrected on the basis of this comparison.

In a first example embodiment, a first variable characterizing the quantity of ammonia in the exhaust gas downstream from the exhaust-gas aftertreatment system is detected, the quantity of reducing agent being decreased when the first variable exceeds an upper threshold value and/or the quantity of reducing agent being increased when the first variable falls below a lower threshold value.

In a second example embodiment, a second variable characterizing the quantity of nitrogen oxides in the exhaust gas downstream from the exhaust-gas aftertreatment system is detected, the quantity of reducing agent being decreased when the second variable falls below a lower threshold value and/or the quantity of reducing agent being increased when the second variable exceeds an upper threshold value.

A particularly accurate control is obtained with an embodiment in which the quantity of reducing agent is decreased when the first variable exceeds an upper threshold value and/or the quantity of reducing agent is increased when the second variable exceeds an upper threshold value.

In addition, the present invention may be implemented in the form of a computer program having program code means and in the form of a computer program product having program code means. The computer program according to the present invention has program code means for performing all the steps of the method according to the present invention when the program is executed on a computer, e.g., a control unit for an internal combustion engine of a motor vehicle. In this case, the invention is implemented by a program stored in the control unit, so that this control unit, equipped with the program, constitutes an embodiment of the present invention. The computer program product according to the present invention has program code means which are stored on a computer-readable data medium for executing the method according to the present invention when this program product is run on a computer, e.g., a control unit for an internal combustion engine of a motor vehicle. Thus, in this case, the invention is implemented by a data medium, so that the method according to the present invention may be implemented when the program product and/or the data medium is integrated into a control unit or an internal combustion engine of a motor vehicle. The data medium and/or the computer program product may be an electric memory medium, e.g., a read-only memory (ROM), an EPROM or a permanent electric memory such as a CD-ROM or DVD.

DETAILED DESCRIPTION

Figure 1:
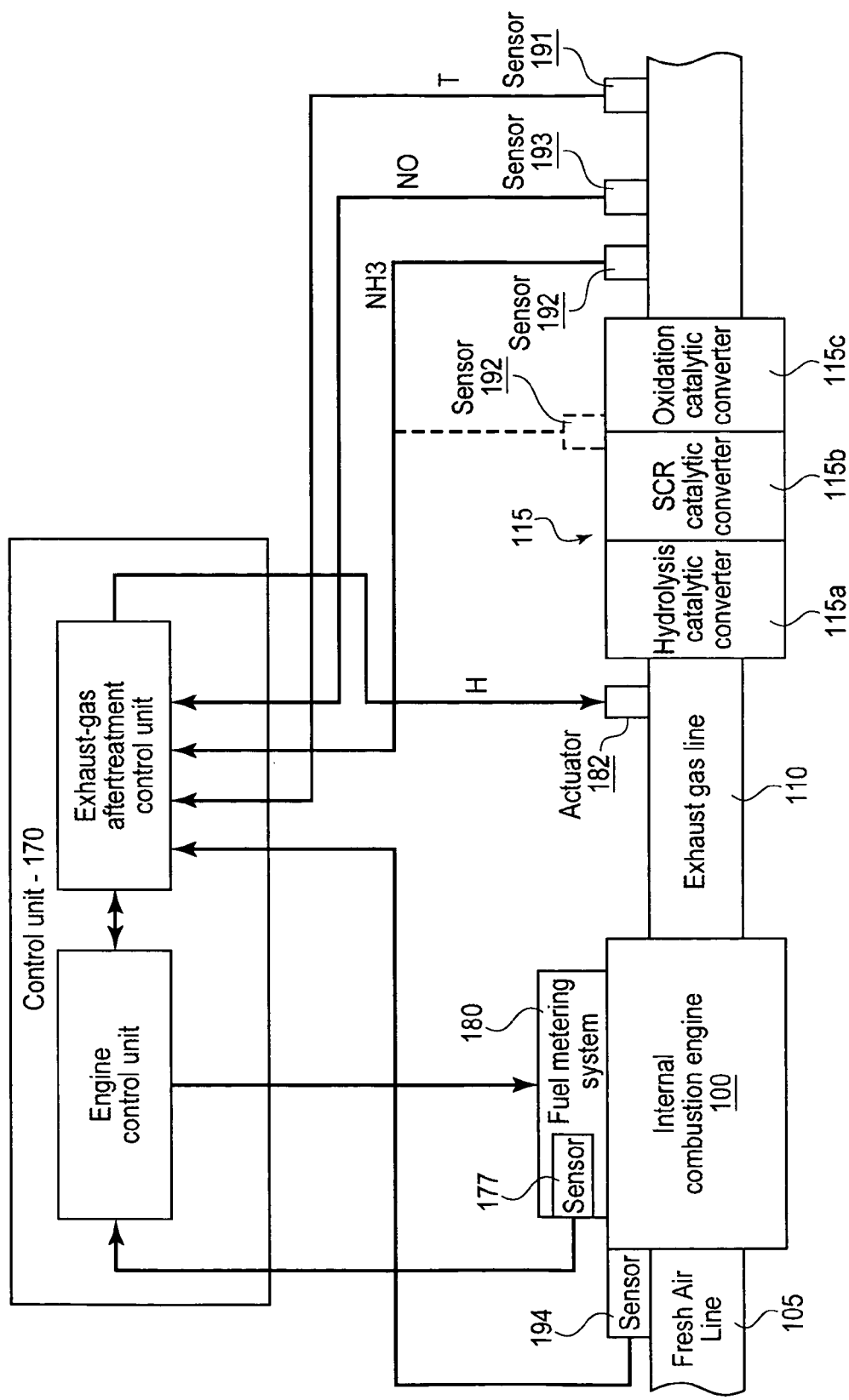
FIG. 1 is a block diagram illustrating an embodiment of an exhasust-gas aftertreatment system according to the present invention.

FIG. 1 shows the essential elements of an exhaust-gas aftertreatment system of an internal combustion engine. Internal combustion engine 100 receives fresh air through a fresh air line 105. Exhaust gases from internal combustion engine 100 enter the environment through an exhaust gas line 110. An exhaust-gas aftertreatment system 115 is provided in the exhaust gas line. This is preferably a catalytic converter. In addition, it is possible for a plurality of catalytic converters to be provided for different pollutants, or for a combination of at least one catalytic converter and one particle filter to be used.

In an example embodiment, exhaust-gas aftertreatment system 115 includes one catalytic converter or three catalytic converters in which preferably three reactions take place. The aqueous urea solution supplied with control element 182 is converted to ammonia $NH_3$ in a first hydrolysis catalytic converter 115a. The actual reaction takes place in downstream SCR catalytic converter 115b, where nitrogen oxides and ammonia react to form nitrogen and water. Unconsumed ammonia is oxidized in downstream oxidation catalytic converter 115c.

In alternative embodiments in which other reducing agents are used, other catalytic converters may also be used or individual catalytic converters may be omitted. The hydrolysis catalytic converter may be omitted when the reducing agent is supplied directly.

In addition, a control unit 170 including at least one engine control unit 175 and an exhaust-gas aftertreatment control unit 172 is also provided. Engine control unit 175 sends triggering signals to a fuel metering system 180. Exhaust-gas aftertreatment control unit 172 exchanges signals with engine control unit 175. Furthermore, exhaust-gas aftertreatment control unit 172 sends triggering signals to an actuator element 182 situated in the exhaust gas line upstream from or in the exhaust-gas aftertreatment system.

In addition, various sensors which supply signals to the exhaust-gas aftertreatment control unit and the engine control unit may also be provided. For example, at least one first sensor 194 may be provided to supply signals characterizing the state of the internal combustion engine. A second sensor 177 supplies signals characterizing the state of fuel metering system 180.

A temperature sensor 191 detects a temperature variable T which characterizes the temperature of the exhaust-gas aftertreatment system. Temperature sensor 191 may be situated downstream from catalytic converter 115. A sensor 193 detects a nitrogen oxide concentration in the exhaust gas downstream from the exhaust-gas aftertreatment system. An emission sensor 192 detects an $NH_3$ signal which characterizes the quantity of ammonia in the exhaust gas downstream from the exhaust-gas aftertreatment system. The emission sensor may be situated between SCR catalytic converter 115b and oxidation catalytic converter 115c. An emission sensor 192 or a sensor 193 which detects the nitrogen oxide concentration in the exhaust gas downstream from the exhaust-gas aftertreatment system may be provided.

Exhaust-gas aftertreatment control unit 172 receives the output signals of sensors 191, 192 and 193. Engine control unit 175 receives the output signals of second sensor 177. Other sensors not shown here may also be provided to characterize a signal related to the driver's intent or other ambient conditions or engine operating states.

The engine control unit and the exhaust-gas aftertreatment control unit may form one structural unit. However, it is also possible for these units to be designed as two physically separate control units.

The procedure according to the present invention is described below using the example of a reduction catalytic converter, which is used in particular with direct-injection internal combustion engines. However, the procedure according to the present invention is not limited to this application, but instead may also be used with other internal combustion engines having an exhaust-gas aftertreatment system. In particular, it may be used with exhaust-gas aftertreatment systems in which a catalytic converter and a particle filter are combined.

On the basis of the sensor signals received, engine control 175 computes trigger signals to be applied to fuel metering system 180, which then meters the proper quantity of fuel for internal combustion engine 100. During combustion, nitrogen oxides may be formed in the exhaust gas. They are converted into nitrogen and water by reduction catalytic converter 115b in exhaust-gas aftertreatment system 115. To do so, a reducing agent must be supplied to the exhaust gas upstream from the exhaust-gas aftertreatment system. In the embodiment illustrated here, this reducing agent is supplied to the exhaust gas via actuator member 182. Ammonia may be used as the reducing agent; it is formed from a urea solution in hydrolysis catalytic converter 115a.

Actuator element 182 may be situated in exhaust gas line 110. However, it may also be mounted in or on the exhaust-gas aftertreatment system, in particular on hydrolysis catalytic converter 115a.

In the embodiment described below, an aqueous urea solution is supplied to the exhaust-gas aftertreatment system with actuator element 182. The aqueous urea solution is hereinafter referred to as the reducing agent.

Figure 2:
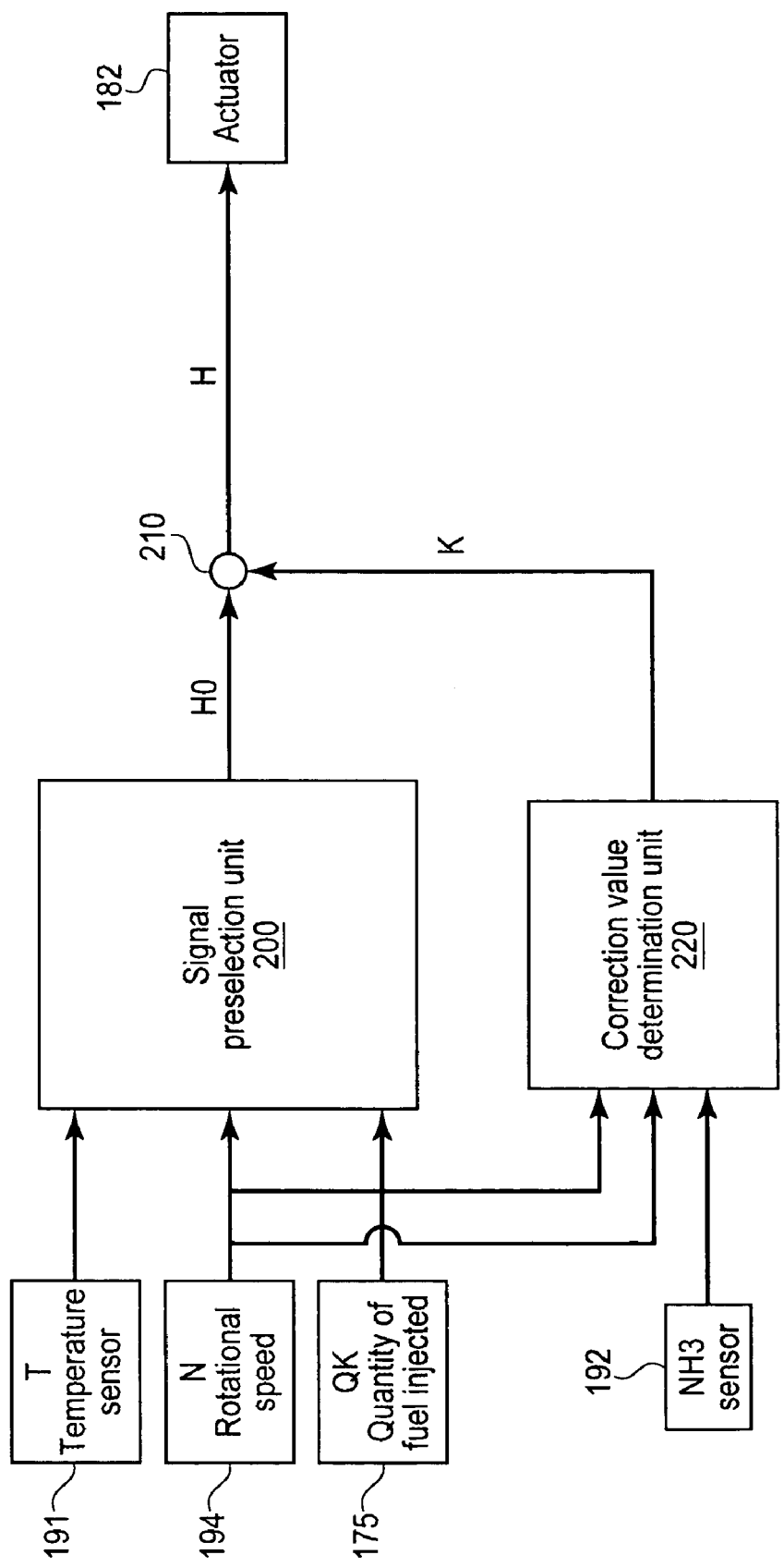
FIG. 2 is a block diagram illustrating an embodiment of an exhaust-gas aftertreatment control unit included in the system shown in FIG. 1.

FIG. 2 shows exhaust-gas aftertreatment control unit 172 in greater detail. Elements already described in conjunction with FIG. 1 are labeled here with the same reference numbers. Essentially, exhaust-gas aftertreatment control unit 172 includes a signal preselection unit 200 and a correction value determination unit 220. Output signal H0 of signal preselection unit goes to a node 210 along with output signal K of the correction value preselection. Actuator element 182 is triggered with output signal H of node 210.

Correction value determination unit 220 processes the output signals of sensor 193, which detects the nitrogen oxide concentration in the exhaust gas downstream from the exhaust-gas aftertreatment system and/or the output signal of emission sensor 192, which supplies an $NH_3$ signal that characterizes the quantity of ammonia in the exhaust gas downstream from the exhaust-gas aftertreatment system. Furthermore, correction value determination unit 220 receives operating characteristics such as rotational speed N and quantity of fuel QK injected into the internal combustion engine.

Signal preselection unit 200 receives various operating characteristics, e.g., rotational speed N, quantity of fuel QK injected into the internal combustion engine, and various temperature variables T, which may characterize the exhaust gas temperature upstream from, within and/or downstream from exhaust-gas aftertreatment system 115.

Based on these variables, the signal preselection unit calculates a triggering signal H0 with which actuator element 182 is triggered. Values H0 which determine the triggering signal for actuator element 182 may be stored in one or more engine characteristics maps as a function of the input variables. It is possible to provide for variables stored in the engine characteristics map to be corrected on the basis of various operating characteristics.

A procedure for preselecting triggering signal H0 is described in German Patent 199 03 439, for example. However, the procedure according to the present invention is not limited to this type of determination of the triggering signals for actuator element 182. It may also be applied in a similar manner to other procedures for determining the triggering signal or for determining other variables which determine this triggering signal. The signal preselection unit 200 preselects the triggering signal for actuator element 182 and/or a variable which determines the quantity of reducing agent to be supplied to the exhaust-gas aftertreatment system.

Since internal combustion engines and/or exhaust-gas aftertreatment systems usually exhibit tolerances, the values stored in signal preselection unit 200 are very inaccurate, i.e., are also subject to high tolerances. In other words, compromises must be made with regard to emissions of ammonia and/or nitrogen oxides.

To be able to achieve a further reduction in emissions and/or unwanted exhaust gas constituents, a specific adjustment of the metering system to the particular internal combustion engine and/or to the particular exhaust-gas aftertreatment system is performed according to the present invention. To do so, sensor 192 situated in or downstream from the exhaust-gas aftertreatment system is used to detect nitrogen oxide emissions or ammonia emissions.

The emissions thus detected are compared with suitable setpoint values which are to be achieved. The values stored in the signal preselection unit are corrected when limiting values are exceeded and/or not met. This is accomplished by correction value preselection unit 220, which preselects a correction value K for the embodiment illustrated here, this correction value being associated with the output signal H0 of signal preselection unit for forming triggering signal H. An additive or multiplicative correction is preferably performed.

This compensation is preferably performed at the time of initial operation of the vehicle and then at regular intervals and/or when certain states of the internal combustion engine and/or exhaust-gas aftertreatment system occur.

Figure 3:
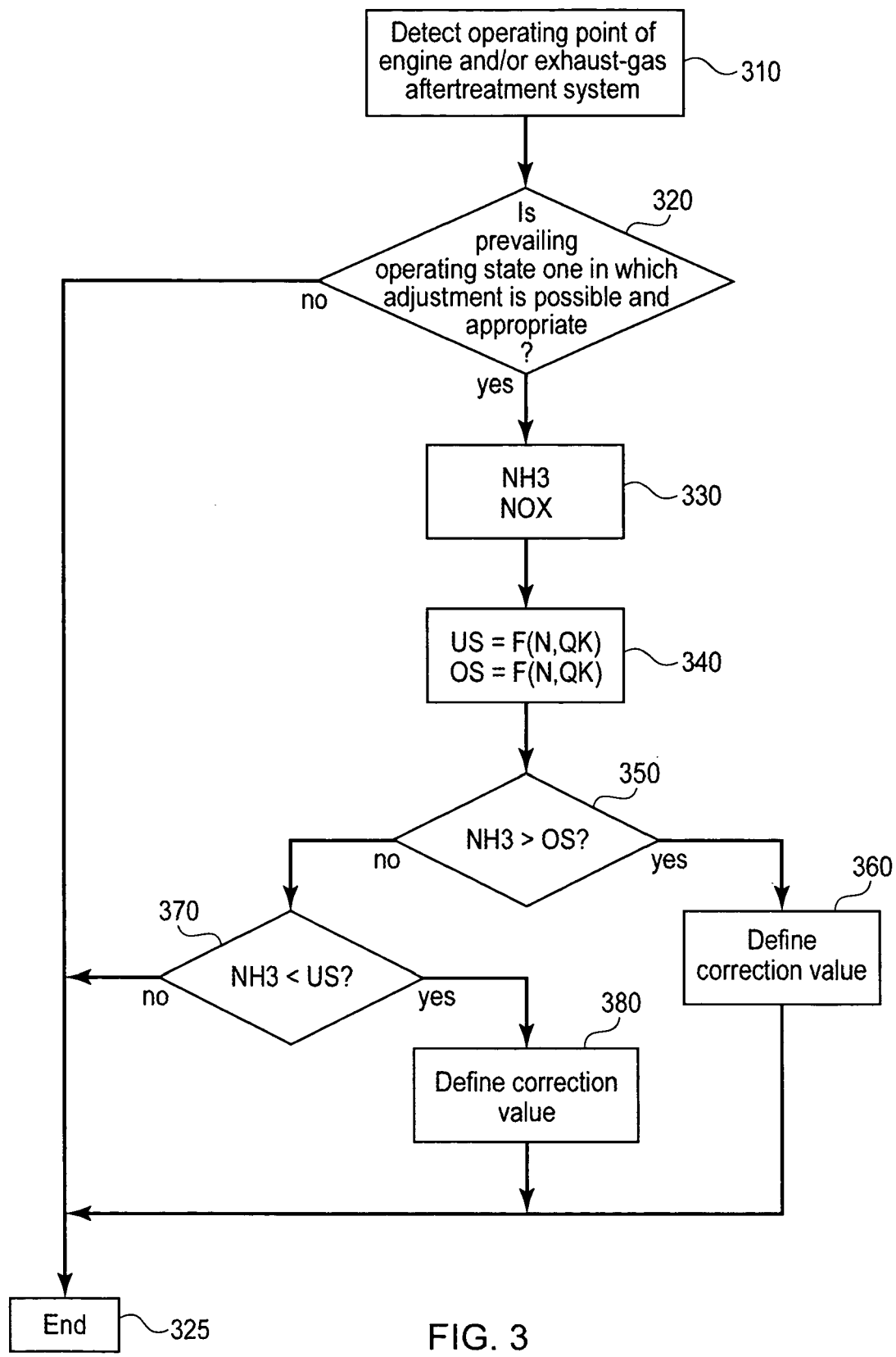
FIG. 3 is a flowchart illustrating an embodiment of a method according to the present invention.

FIG. 3 illustrates the functioning of correction value determination unit 220 in greater detail. In a first step 310, the operating point of the internal combustion engine and/or the exhaust-gas aftertreatment system is detected. For example, rotational speed N and quantity of fuel injected QK of the internal combustion engine are analyzed. Furthermore, it is possible to provide for the reading of an elapsed time meter and/or an odometer which detects the total distance traveled.

Then, in step 320, a check is performed to ascertain whether the prevailing state is one in which adjustment is possible and appropriate. Such operating states include steady-state operating states in which the values detected are constant over a certain period of time. This is necessary because the exhaust-gas aftertreatment system has a relatively long dead time. This means that when there are changes in the operating state, they have an effect only after a certain lag time.

An adjustment is performed only in such operating states in which the system is in a stable state, i.e., a certain period of time should have elapsed since the last change in operating characteristics. In addition, it is possible to provide for the adjustment to take place only when the internal combustion engine and/or the exhaust-gas aftertreatment system is at certain operating points. These operating points are defined by various operating characteristics, e.g., rotational speed N of the internal combustion engine, quantity of fuel QK injected and/or certain temperature values T, in particular for the exhaust gas temperature.

In addition, it is possible to check on whether a certain period of time has elapsed since the last adjustment and/or whether a certain driving performance of the internal combustion engine and/or the exhaust-gas aftertreatment system has been achieved.

If query 320 detects that a suitable operating state does not exist, the program is terminated in step 325. If a suitable operating state prevails, then in step 330 the output signal of suitable sensors is analyzed. Measured variables characterizing the effect of the exhaust-gas aftertreatment system may be detected here. For example, in the case of the supply of urea, the ammonia content in the exhaust gas downstream from the exhaust-gas aftertreatment system, e.g., downstream from the reduction catalytic converter, may be analyzed. In addition, it is possible for the nitrogen oxide concentration, i.e., the concentration of unwanted substances that are to be eliminated by the exhaust-gas aftertreatment system, to be detected by a sensor.

In the next step 340, a lower threshold value US is preselected as a function of the operating state of the internal combustion engine and/or the exhaust-gas aftertreatment system. Similarly, an upper threshold value OS is also preselected as a function of these variables. The state variable may be the rotational speed, quantity of fuel injected QK and, if necessary, other variables such a temperature values T characterizing the exhaust gas temperature.

In a simplified embodiment, it is possible to provide for fixed values to be specified, this method being implemented only at certain operating points at which the $NH_3$ and $NO_x$ signals assume the expected values.

Then, in step 350, a check is performed to determine whether the output signal of the ammonia sensor is greater than the upper threshold value. If this is the case, then in step 360 a correction value is defined, resulting in a decrease of the quantity of reducing agent supplied. For example, it is possible to provide for a negative correction value to be supplied or for the output value of the signal preselected to be multiplied by a value less than 1. Then the program likewise ends in step 325.

If query 350 detects that the output signal of ammonia sensor 192 is lower than the upper threshold value OS, then subsequent query 370 checks on whether the output signal of the sensor is smaller than lower threshold value US. If this is the case, then in step 380 a correction value is preselected so that it produces an increase in the quantity of reducing agent supplied.

In the alternative embodiment, it is possible to provide for a check to be performed in step 370 to determine whether the $NO_x$ output signal of a nitrogen oxide sensor 193 is greater than a threshold value US, in which case a correction is also performed to increase the quantity of reducing agent. Accordingly, it is also possible to proceed in the case of query 350 such that the output signal of a $NO_x$ sensor is checked to determine whether it is lower than a threshold value and in this case the quantity of reducing agent is decreased.

According to the present invention, in certain states of the internal combustion engine and/or the exhaust-gas aftertreatment system, the measured variable characterizing the effect of the exhaust-gas aftertreatment system is compared with expected values and the quantity of reducing agent is corrected on the basis of this comparison.

It is possible for the output signal of the signal preselection unit to be corrected or for the signal preselection to be altered, i.e., the values stored in the engine characteristics maps, for example, to be altered accordingly. For example, the quantity of reducing agent is decreased when the quantity of ammonia exceeds an upper threshold value and/or the quantity of reducing agent is increased when the quantity of nitrogen oxide exceeds an upper threshold value.

According to the present invention, systems having only one ammonia sensor or one nitrogen oxide sensor are used, but as an alternative it is also possible to provide systems with an ammonia sensor and a nitrogen oxide sensor. One may use a nitrogen oxide sensor which may also be used for other functions in the area of controlling the internal combustion engine and/or the exhaust-gas aftertreatment system.

The procedure according to the present invention is not limited to systems which use urea or a similar compound as a reducing agent, e.g., when a nitrogen oxide sensor is used, but instead it may also be used with other systems which employ different reducing agents. It is possible to provide for hydrocarbons to be supplied as reducing agents to the exhaust gas. This is possible using an actuator member 182. As an alternative, it is also possible to meter hydrocarbons, which are used in particular as fuel supplied via conventional actuator elements 180 for controlling the quantity of fuel injected into the internal combustion engine. Thus, for example, it is possible to provide for a secondary injection to introduce the corresponding hydrocarbons into the exhaust gas.

What is claimed is:

1. A method for controlling an exhaust-gas aftertreatment system of an internal combustion engine, the exhaust-gas aftertreatment system having at least one catalytic converter, the method comprising:
   supplying a selected quantity of a reducing agent to the exhaust-gas aftertreatment system as a function of a state of at least one of the internal combustion engine and the exhaust-gas aftertreatment system;
   measuring a first measured quantity and a second measured quantity downstream of the exhaust-gas aftertreatment system;
   adjusting the quantity of the reducing agent supplied as a function of the first measured quantity and the second measured quantity, wherein the first measured quantity depends on at least one of the concentration of substances required for conversion of exhaust gas and the concentration of resulting undesired intermediate products, and wherein the second measured quantity depends on the concentration of substances that are one of not converted in the exhaust-gas aftertreatment system and only partially converted in the exhaust-gas aftertreatment system;
   wherein the quantity of the reducing agent is decreased when the first measured quantity exceeds a first upper threshold value; and
   wherein the quantity of the reducing agent is increased when the second measured quantity exceeds a second upper threshold value.

2. The method according to claim 1, wherein the second measured quantity characterizes a nitrogen oxide concentration in the exhaust gas downstream from the exhaust-gas aftertreatment system.

3. The method according to claim 1, wherein the first measured quantity characterizes a quantity of ammonia in the exhaust gas downstream from the exhaust-gas aftertreatment system.

4. The method according to claim 1, wherein the first upper threshold value and the second upper threshold value are specified as a function of at least one of the operating state of the internal combustion engine and the operating state of the exhaust-gas aftertreatment system.

5. The method according to claim 4, wherein the first and second upper threshold values are specified in certain operating states.

6. A device for controlling an exhaust-gas aftertreatment system of an internal combustion engine, the exhaust-gas aftertreatment system having at least one catalytic converter, the device comprising:
   an arrangement for supplying a selected quantity of a reducing agent to the exhaust-gas aftertreatment system as a function of a state of at least one of the internal combustion engine and the exhaust-gas aftertreatment system;
   an arrangement for measuring a first measured quantity downstream of the exhaust-gas aftertreatment system;
   an arrangement for measuring a second measured quantity downstream of the exhaust-gas aftertreatment system; and
   an arrangement for adjusting the quantity of the reducing agent supplied as a function of the first measured quantity and the second measured quantity, wherein the first measured quantity depends on at least one of the concentration of substances required for conversion of exhaust gas and the concentration of resulting undesired intermediate products, and wherein the second measured quantity depends on the concentration of substances that are one of not converted in the exhaust-gas aftertreatment system and only partially converted in the exhaust-gas aftertreatment system;
   wherein the quantity of the reducing agent is decreased when the first measured quantity exceeds a first upper threshold value, and wherein the quantity of the reducing agent is increased when the second measured quantity exceeds a second upper threshold value.

7. A computer-readable medium having stored thereon instructions for execution on a computer for controlling an internal combustion engine having an exhaust-gas aftertreatment system, the instructions, upon execution on the computer, performing:
   control of a supply of a selected quantity of a reducing agent to the exhaust-gas aftertreatment system as a function of a state of at least one of the internal combustion engine and the exhaust-gas aftertreatment system;
   control of measuring a first measured quantity and a second measured quantity downstream of the exhaust-gas aftertreatment system; and
   control of adjusting the quantity of the reducing agent supplied as a function of the first measured quantity and the second measured quantity, wherein the first measured quantity depends on at least one of the concentration of substances required for conversion of exhaust gas and the concentration of resulting undesired intermediate products, and wherein the second measured quantity depends on the concentration of substances that are one of not converted in the exhaust-gas aftertreatment system and only partially converted in the exhaust-gas aftertreatment system;

wherein the quantity of the reducing agent is decreased when the first measured quantity exceeds a first upper threshold value, and wherein the quantity of the reducing agent is increased when the second measured quantity exceeds a second upper threshold value.

8. A computer-readable data storage element for storing a computer program having a plurality of instruction codes executable by a computer for controlling an internal combustion engine having an exhaust-gas aftertreatment system, the instruction codes performing:

control of a supply of a selected quantity of a reducing agent to the exhaust-gas aftertreatment system as a function of a state of at least one of the internal combustion engine and the exhaust-gas aftertreatment system;

control of measuring a first measured quantity and a second measured quantity downstream of the exhaust-gas aftertreatment system; and control of adjusting the quantity of the reducing agent supplied as a function of the first measured quantity and the second measured quantity, wherein the first measured quantity depends on at least one of the concentration of substances required for conversion of exhaust gas and the concentration of resulting undesired intermediate products, and wherein the second measured quantity depends on the concentration of substances that are one of not converted in the exhaust-gas aftertreatment system and only partially converted in the exhaust-gas aftertreatment system;

wherein the quantity of the reducing agent is decreased when the first measured quantity exceeds a first upper threshold value, and wherein the quantity of the reducing agent is increased when the second measured quantity exceeds a second upper threshold value.

* * * * *